US008370139B2

(12) United States Patent
Akamine et al.

(10) Patent No.: US 8,370,139 B2
(45) Date of Patent: Feb. 5, 2013

(54) FEATURE-VECTOR COMPENSATING APPARATUS, FEATURE-VECTOR COMPENSATING METHOD, AND COMPUTER PROGRAM PRODUCT

(75) Inventors: Masami Akamine, Kanagawa (JP);
Takashi Masuko, Kanagawa (JP);
Daniel Barreda, Kanagawa (JP); Remco Teunen, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1218 days.

(21) Appl. No.: 11/723,410

(22) Filed: Mar. 19, 2007

(65) Prior Publication Data

US 2007/0260455 A1 Nov. 8, 2007

(30) Foreign Application Priority Data

Apr. 7, 2006 (JP) ................. 2006-106594

(51) Int. Cl.
*G10L 15/20* (2006.01)
*G10L 21/02* (2006.01)
*G10L 15/06* (2006.01)
*G10L 15/28* (2006.01)
*G10L 15/14* (2006.01)
(52) U.S. Cl. ........ 704/233; 704/226; 704/243; 704/255; 704/244; 704/227; 704/256; 704/256.02
(58) Field of Classification Search .................. 704/256, 704/256.02, 244, 255, 226, 227, 233, 243, 704/43
See application file for complete search history.

(56) References Cited

U.S. PATENT DOCUMENTS

| | | | |
|---|---|---|---|
| 5,627,939 A * | 5/1997 | Huang et al. ............ | 704/256 |
| 5,749,068 A | 5/1998 | Suzuki | |
| 5,854,999 A | 12/1998 | Hirayama | |
| 5,970,446 A | 10/1999 | Goldberg et al. | |
| 6,006,186 A * | 12/1999 | Chen et al. ............ | 704/254 |
| 6,230,128 B1 * | 5/2001 | Smyth ..................... | 704/236 |
| 6,381,572 B1 | 4/2002 | Ishimitsu et al. | |
| 6,418,411 B1 * | 7/2002 | Gong ...................... | 704/256.5 |

(Continued)

FOREIGN PATENT DOCUMENTS

| | | |
|---|---|---|
| EP | 0 886 263 | 12/1998 |
| JP | 09-258783 | 3/1997 |

(Continued)

OTHER PUBLICATIONS

L. Deng, J.Droppo, and A. Acero, "Dynamic compensation of hmm variances using the feature enhancement uncertainty computed from a parametric model of speech distortion," IEEE Trans. SAP, vol. 13, 2005.*

(Continued)

*Primary Examiner* — Edgar Guerra-Erazo
(74) *Attorney, Agent, or Firm* — Nixon & Vanderhye, P.C.

(57) ABSTRACT

A noise-environment storing unit stores therein a compensation vector for compensating a feature vector of a speech. A feature-vector extracting unit extracts the feature vector of the speech in each of a plurality of frames. A noise-environment-series estimating unit estimates a noise-environment series based on a feature-vector series and a degree of similarity. A calculating unit obtains a compensation vector corresponding to each noise environment in estimated noise-environment series based on the compensation vector present in the noise-environment storing unit. A compensating unit compensates the extracted feature vector of the speech based on obtained compensation vector.

8 Claims, 7 Drawing Sheets

U.S. PATENT DOCUMENTS

| | | | |
|---|---|---|---|
| 6,876,966 B1 | 4/2005 | Deng et al. | |
| 6,907,398 B2* | 6/2005 | Hoege | 704/265 |
| 6,950,796 B2* | 9/2005 | Ma et al. | 704/244 |
| 7,065,487 B2 | 6/2006 | Miyazawa | |
| 7,065,488 B2 | 6/2006 | Yajima et al. | |
| 7,103,540 B2* | 9/2006 | Droppo et al. | 704/226 |
| 7,107,214 B2* | 9/2006 | Nakatsuka | 704/244 |
| 7,139,703 B2* | 11/2006 | Acero et al. | 704/228 |
| 7,216,077 B1* | 5/2007 | Padmanabhan et al. | 704/240 |
| 7,219,057 B2* | 5/2007 | Yang | 704/236 |
| 7,337,113 B2* | 2/2008 | Nakagawa et al. | 704/233 |
| 7,403,896 B2* | 7/2008 | Takiguchi et al. | 704/256.2 |
| 7,447,630 B2 | 11/2008 | Liu et al. | |
| 7,516,071 B2* | 4/2009 | Chaudhari et al. | 704/244 |
| 7,590,530 B2* | 9/2009 | Zhao et al. | 704/226 |
| 7,646,912 B2 | 1/2010 | Hemmert et al. | |
| 2002/0042712 A1 | 4/2002 | Yajima et al. | |
| 2002/0091521 A1* | 7/2002 | Yuk et al. | 704/240 |
| 2005/0114124 A1 | 5/2005 | Liu et al. | |
| 2007/0055508 A1* | 3/2007 | Zhao et al. | 704/226 |
| 2007/0276662 A1 | 11/2007 | Akamine et al. | |

FOREIGN PATENT DOCUMENTS

| | | |
|---|---|---|
| JP | 11-296192 | 10/1999 |
| JP | 2000-181934 | 6/2000 |
| JP | 2000-194392 | 7/2000 |
| JP | 2000-330598 | 11/2000 |
| JP | 2002-140089 | 5/2002 |
| JP | 2002-372982 | 12/2002 |
| JP | 2003-308092 | 10/2003 |
| JP | 2005-157354 | 6/2005 |

OTHER PUBLICATIONS

Moreno, Pedro J., "Speech Recognition in Noisy Environments", Department of Electrical and Computer Engineering, Carnegie Mellon University, Pittsburgh, Pennsylvania, 15213, Apr. 22, 1996, pp. 1-130.*

Kim, et al., "Speech Recognition in Noisy Environments Using First Order Vector Taylor Series", Speech Communication 24, 1998, pp. 39-49.*

Woodland. Speaker Adaptation for Continuous Density HMMs: A Review. ITRW on Adaptation Methods for Speech Recognition, 2001, pp. 11-19.*

Kuhn, R.; Junqua, J.-C.; Nguyen, P.; Niedzielski, N.;, "Rapid speaker adaptation in eigenvoice space," Speech and Audio Processing, IEEE Transactions on , vol. 8, No. 6, pp. 695-707, Nov. 2000.*

Hu et al, An HMM Compensation Approach Using Unscented Transformation Recognition, In Proceedings of the International Symposium on Chinese Spoken Language Processing, 2006.*

Deng, et al, Dynamic Compensation of HMM Variances Using the Feature Enhancement Uncertainty Computer from a Parametric Model of Speech Distortion, IEEE Trans. of Speech and Audio Processing, vol. 13, No. 3, pp. 412-421, 2005.*

Deng et al., "High-Performance Robust Speech Recognition Using Stereo Training Data", Microsoft Research (2001).

Deng et al. "Large-Vocabulary Speech Recognition under Adverse Acoustic Environments"; ISCA Archive; Sixth International conference on Spoken Language Processing (ICSLP 2000).

Akira Sasou et al.; "HMM-Based Noise Robust Feature Compensation"; Proceedings of the 2003 Autumn meeting of the Acoustical Society of Japan, Sep. 17, 2003, vol. 1, pp. 23-24 with partial translation.

Tadashi Suzuki et al. ; "Review of Speech Reconigion Under Non-Stationary Noise Using Noise Standard Pattern"; Proceedings of the 1996 Spring meeting of the Acoustical Society of Japan, Japan, the Acoustical Society of Japan, Mar. 26, 1996, vol. 1, pp. 81-82 with partial translation.

Office Action in Japanese Application No. 2006-106594 dated Oct. 7, 2008 and partial English-language translation thereof.

H.K. Kim and R.C. Rose, "Cepstrum-Domain Acoustic Feature Compensation Based on Decomposition of Speech and noise for ASR in Noisy Environments", IEEE Transactions on Speech and Audio Processing, vol. 11, No. 5, Sep. 2003, pp. 435-446.

Office Action dated Sep. 2, 2010 in U.S. Appl. No. 11/723,410.

* cited by examiner

FEATURE-VECTOR COMPENSATING APPARATUS, FEATURE-VECTOR COMPENSATING METHOD, AND COMPUTER PROGRAM PRODUCT

CROSS-REFERENCE TO RELATED APPLICATIONS

This application is based upon and claims the benefit of priority from the prior Japanese Patent Application No. 2006-106594, filed on Apr. 7, 2006; the entire contents of which are incorporated herein by reference.

BACKGROUND OF THE INVENTION

1. Field of the Invention

The present invention generally relates to a technology for speech processing, and specifically relates to speech processing under a background noise environment.

2. Description of the Related Art

In speech recognition under a noise environment, a mismatch of a speech model causes a problem of degrading a recognition performance due to a difference between a noise environment at a time of learning and a noise environment at a time of recognition. One of the effective methods to cope with the problem is a stereo-based piecewise linear compensation for environments (SPLICE) method proposed in Li Deng, Alex Acero, Li Jiang, Jasha Droppo and Xuedong Huang, "High-performance robust speech recognition using stereo training data", Proceedings of 2001 International Conference on Acoustics, Speech, and signal Processing, pp. 301-304.

The SPLICE method obtains a compensation vector in advance from a pair of clean speech data and noisy speech data in which a noise is superimposed on the clean speech data, and brings a feature vector at a time of the speech recognition close to a feature vector of the clean speech by using the compensation vector. The SPLICE method can also be viewed as a method of noise reduction.

With such a compensation process, it has been reported that a high recognition rate can be achieved even under a mismatch between training conditions and recognition conditions.

However, because the conventional SPLICE method performs a selection of the noise environment in each frame as short as 10 to 20 milliseconds, a different environment may be selected for each frame even when the same environment is continued for a certain period of time, resulting in a degradation of the recognition performance.

Furthermore, the conventional SPLICE method compensates the feature vector only for a single noise environment selected from a number of pre-designed noise environments frame by frame, the noise environment designed in advance does not necessarily match the noise environment at the time of the speech recognition. So a degradation of the recognition performance may be caused by a mismatch of the acoustic model.

SUMMARY OF THE INVENTION

According to an aspect of the present invention, a feature-vector compensating apparatus for compensating a feature-vector of a speech used in a speech processing under a background noise environment includes a first storing unit that stores therein a compensation vector for compensating the feature vector of the speech for each of a plurality of noise environments; an feature extracting unit that extracts the feature vector of the speech in each of a plurality of frames of an input speech; an estimating unit that estimates a noise-environment series based on a feature-vector series that is a series of a plurality of extracted feature vectors for the frames and a degree of similarity that indicates a certainty that the feature vector is generated under the noise environment in each of a current frame and at least one of an immediately previous frame and an immediately subsequent frame of the current frame; a calculating unit that obtains a compensation vector corresponding to each noise environment in estimated noise-environment series based on the compensation vector present in the first storing unit; and a compensating unit that compensates the extracted feature vector of the speech based on obtained compensation vector.

According to another aspect of the present invention, a method of compensating a feature vector of a speech used in a speech processing under a background noise environment includes extracting the feature vector of the speech in each of a plurality of frames of an input speech; estimating a noise-environment series based on a feature-vector series that is a series of a plurality of extracted feature vectors for the frames and a degree of similarity that indicates a certainty that the feature vector is generated under the noise environment in each of a current frame and at least one of an immediately previous frame and an immediately subsequent frame of the current frame; obtaining a compensation vector corresponding to each noise environment in estimated noise-environment series based on a previously calculated compensation vector; and compensating the extracted feature vector of the speech based on obtained compensation vector.

According to still another aspect of the present invention, a computer program product having a computer readable medium including programmed instructions, wherein the instructions, when executed by a computer, cause the computer to perform extracting the feature vector of the speech in each of a plurality of frames of an input speech; extracting the feature vector of the speech in each of a plurality of frames of an input speech; estimating a noise-environment series based on a feature-vector series that is a series of a plurality of extracted feature vectors for the frames and a degree of similarity that indicates a certainty that the feature vector is generated under the noise environment in each of a current frame and at least one of an immediately previous frame and an immediately subsequent frame of the current frame; obtaining a compensation vector corresponding to each noise environment in estimated noise-environment series based on a previously calculated compensation vector; and compensating the extracted feature vector of the speech based on obtained compensation vector.

DETAILED DESCRIPTION OF THE INVENTION

Exemplary embodiments according to the present invention will be explained in detail below with reference to the accompanying drawings.

Figure 1:
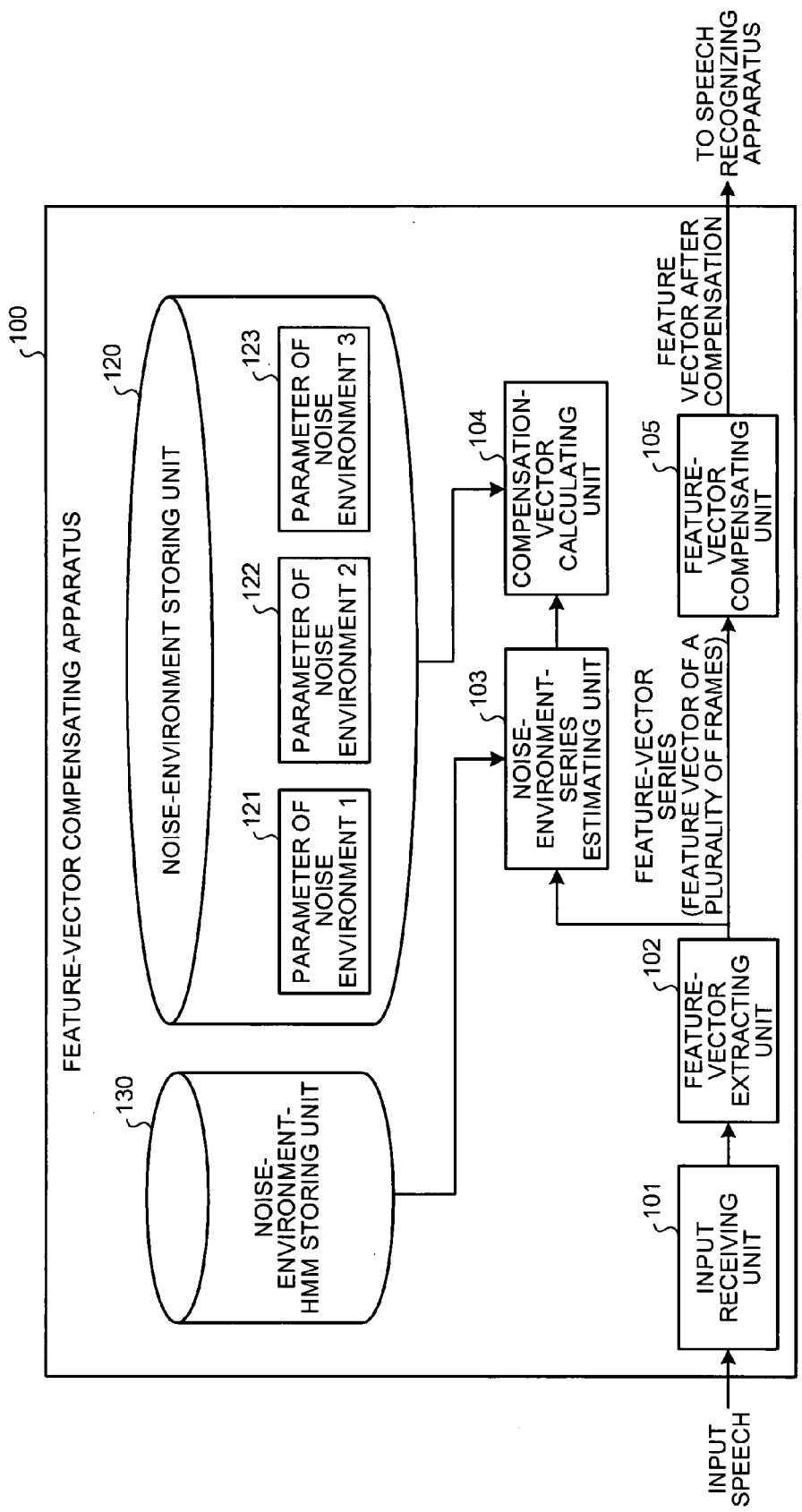
FIG. 1 is a functional block diagram of a feature-vector compensating apparatus according to a first embodiment of the present invention.

FIG. 1 is a functional block diagram of a feature-vector compensating apparatus 100 according to a first embodiment of the present invention. The feature-vector compensating apparatus 100 includes a noise-environment storing unit 120, an input receiving unit 101, a feature-vector extracting unit 102, a noise-environment-series estimating unit 103, a compensation-vector calculating unit 104, a feature-vector compensating unit 105, and a noise-environment-HMM storing unit 130.

The noise-environment storing unit 120 stores therein a Gaussian mixture model (GMM) parameter at a time of modeling a plurality of noise environments by the GMM, and a compensation vector calculated in advance as a compensation vector for a feature vector corresponding to each of the noise environments. The compensation vector present in the noise-environment storing unit 120 is calculated using Equations (5) and (6).

In the first embodiment it is assumed that parameters of three noise environments including a parameter 121 of a noise environment 1, a parameter 122 of a noise environment 2, and a parameter 123 of a noise environment 3 are calculated in advance, and stored in the noise-environment storing unit 120. The number of noise environments is not limited to three, in other words, any desired number of noise environments can be taken as reference data.

The noise-environment storing unit 120 can be configured with any recording medium that is generally used, such as a hard disk drive (HDD), an optical disk, a memory card, and a random access memory (RAM).

The input receiving unit 101 converts a speech input from an input unit (not shown), such as a microphone, into an electrical signal (speech data), performs an analog-to-digital (A/D) conversion on the speech data to convert analog data into digital data based on, for example, a pulse code modulation (PCM), and outputs digital speech data. The processes performed by the input receiving unit 101 can be implemented by using the same method as a digital processing of the speech signal according to a conventional technology.

The feature-vector extracting unit 102 divides the speech data received from the input receiving unit 101 into a plurality of frames each having a predetermined frame length, and extracts a feature vector of the speech for each of divided frames. The frame length can be 10 milliseconds to 20 milliseconds. According to the first embodiment, the feature-vector extracting unit 102 extracts the feature vector of the speech which includes static, $\Delta$, and $\Delta\Delta$ parameters of a Mel frequency cepstrum coefficient (MFCC), for each of the frames.

In other words, the feature-vector extracting unit 102 calculates a total of 39-dimensional feature vector including a 13-dimensional MFCC, and $\Delta$ and $\Delta\Delta$ of the MFCC as the feature vector for each of the divided frames by using a method of discrete-cosine converting a power of an output of a Mel-scaled filter bank analysis, and outputs a time series of a plurality of feature vectors calculated for respective frames as a feature-vector series.

The feature vector is not limited to the above one. In other words, any parameter can be used as a feature vector as long as it represents a feature of the input speech.

The noise-environment-series estimating unit 103 takes the feature-vector series extracted by the feature-vector extracting unit 102 and a noise-environment hidden Markov model (HMM) present in the noise-environment-HMM storing unit 130 as an input, and estimates a noise-environment series that is a series of the noise environments 1 to 3, which generates each of the feature vectors in the feature-vector series, based on a degree of similarity for each of the noise environments 1 to 3, which indicates a certainty that each of the feature vectors is generated under each of the noise environments 1 to 3, and a state transition probability between the noise environments 1 to 3.

The noise-environment-HMM storing unit 130 is a recording medium, such as an HDD, an optical disk, a memory card, and a RAM, which stores thereon the noise-environment HMM that is a hidden Markov model obtained by modeling the noise environment.

The noise-environment HMM maintains each of the noise environments 1 to 3 as a state, and is obtained by modeling parameters of the GMM that is a probability model of the feature vector of each of the noise environments 1 to 3 and the state transition probability at a time of performing a transition between the noise environments 1 to 3. According to the first embodiment, an ergodic HMM in which each state is capable of performing a free transition between the noise environments 1 to 3 is used as the noise environment HMM, and each state is corresponding to one of the noise environments.

Figure 2:
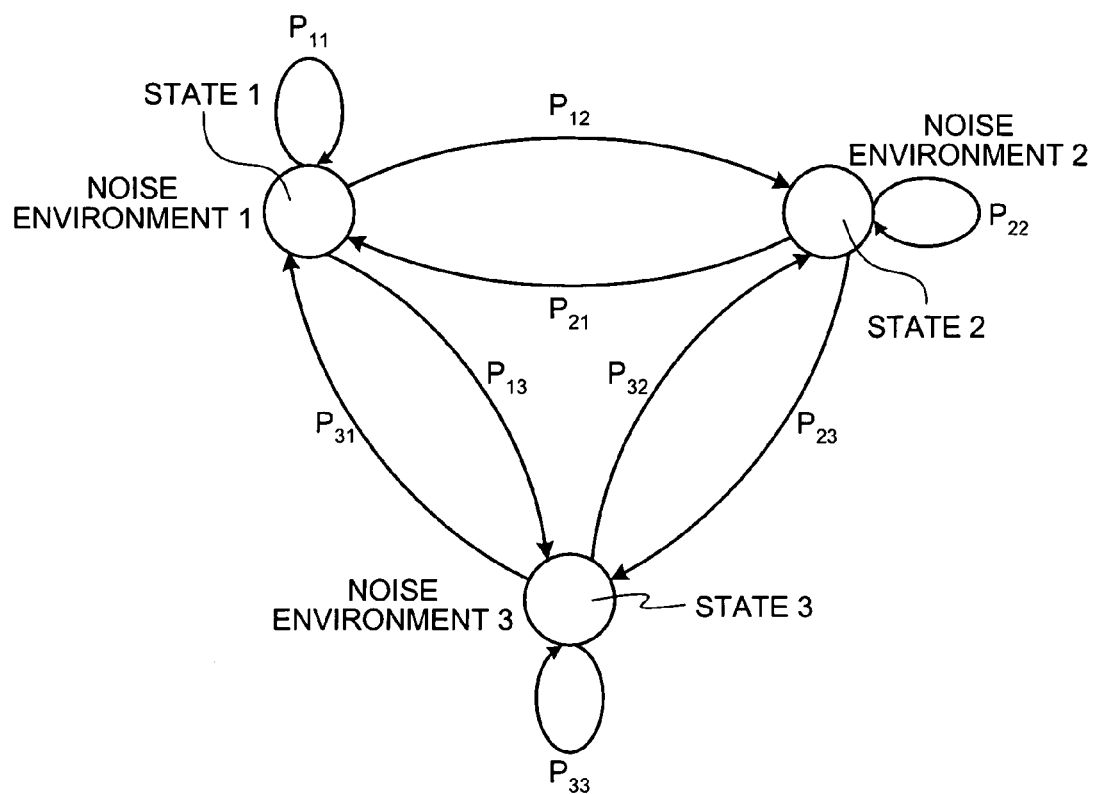
FIG. 2 is a schematic for explaining a noise-environment.

Each state includes a parameter of the GMM representing an event probability of the feature vector, which is a probability model of the feature vector of a speech signal monitored under each of the noise environments, and a transition between the states is modeled by a state transition matrix that takes the state transition probability as an element. FIG. 2 is a schematic for explaining the noise-environment HMM. In the noise-environment HMM, each state of the noise environments 1 to 3 is set as states 1 to 3, and the state transition probability of making a transition between the states is defined as $P_{ij}$. The state transition probability $P_{ij}$ indicates a state transition probability of making a transition from a state i to a state j. For example, $P_{12}$ is a probability of making a transition from the state 1 to the state 2, and $P_{11}$ is a probability of staying in the state 1.

The parameters of the GMM (an average vector $\mu$ and a covariance matrix $\Sigma$) and the state transition matrix are learned and determined prior to a process of compensating the feature vector by preparing a feature vector to which a type label of the noise environments 1 to 3 is granted for each frame as learning data and using a forward-backward algorithm and expectation maximization (EM) algorithm that are now well known in a technical field of the speech recognition. In other words, the noise-environment HMM can be obtained by using an HMM learning tool, a "hidden Markov model toolkit (HTK)", which is a standard in the field of the speech recognition.

The monitored feature-vector series is stochastically output with a state transition of the noise-environment HMM. The noise-environment-series estimating unit 103 obtains a series of states that maximizes an event probability of the feature-vector series from among the series of states of the noise-environment HMM that can output the input feature-vector series by using a Viterbi algorithm, and obtains a series of states that maximizes the event probability of the feature-vector series, i.e., a series of noise environments each of which is corresponding to a state, as a noise-environment series.

Figure 3:
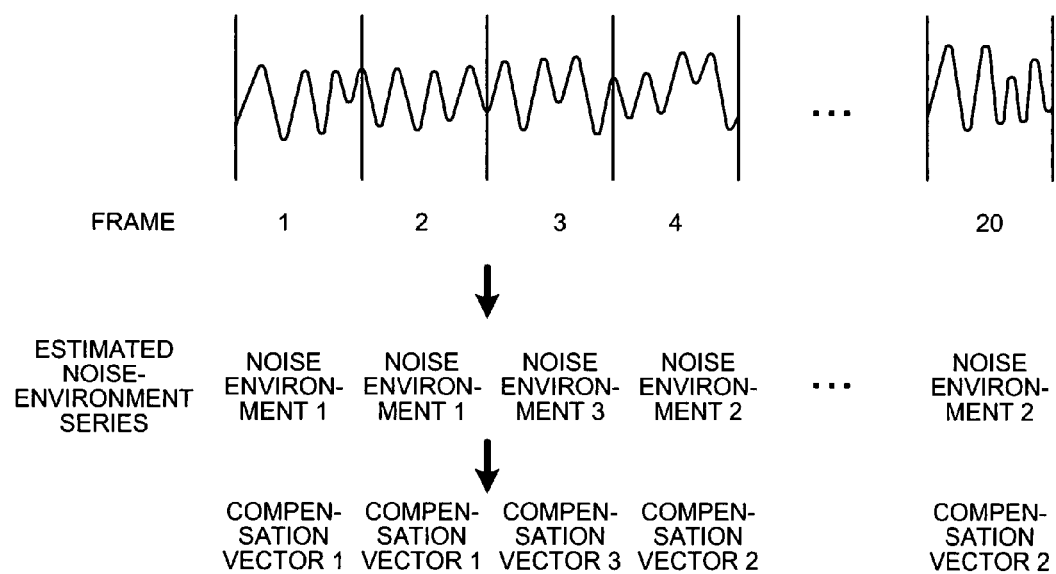
FIG. 3 is a schematic for explaining an example of a noise-environment series estimation and a compensation vector.

For example, when an input speech is divided into 20 frames as shown in FIG. 3, the noise-environment-series estimating unit 103 obtains an event probability of the feature-vector series by multiplying the state transition probability by the degree of similarity of a frame of each of the feature vectors in the feature-vector series with respect to a series of states of all combinations of 20 frames using the states 1 to 3, and estimates a series of noise environments corresponding to a series of states in which the event probability is maximized as the noise-environment series. In the example shown in FIG. 3, a noise-environment series of noise environment 1→noise environment 1→noise environment 3→noise environment 2 → . . . →noise environment 2 is estimated.

In this manner, in the noise-environment-series estimating unit 103, each state of the noise-environment HMM is corresponding to one of the noise environments, and when estimating the noise environment by the Viterbi algorithm, a state probability and a state transition probability of the noise-environment HMM is taken into consideration for each frame.

In other words, the noise-environment-series estimating unit 103 estimates a noise-environment series that is most likely in terms of the probability by using the state probability and the state transition probability of the noise-environment HMM in consideration of the degrees of attribute of a plurality of previous frames including an immediately previous frame (hereinafter, "last frame") and subsequent frames including an immediately subsequent frame (hereinafter, "next frame"), in addition to the degree of similarity of the current frame, across a plurality of frames, instead of obtaining a noise environment of a feature vector from the degree of similarity of each frame alone by calculating the degree of similarity of the noise environment for each frame.

The degree of similarity of a speech of a frame corresponding to each of the noise environments 1 to 3 is calculated as follows. When a feature vector extracted by the feature-vector extracting unit 102 is $y_t$, and a model of a noise environment is e, the degree of similarity is calculated as a likelihood $p(e|y_t)$ of the noise environment e with respect to the feature vector $y_t$ at time t as in Equation (1):

$$p(e \mid y_t) = \frac{p(y_t \mid e)p(e)}{p(y_t)} \quad (1)$$

where $p(y_t|e)$ is a probability that the feature vector $y_t$ appears in the noise environment e, and $p(e)$ and $p(y_t)$ are frequencies of an event of the noise environment e and the feature vector $y_t$, respectively.

When it is assumed that $p(y_t)$ is independent of the noise environment, and the frequency of an event of each of the noise environments is same, the likelihood $p(e|y_t)$ can be calculated using Equation (2):

$$p(e|y_t) = \alpha p(y_t|e) \quad (2)$$

where $p(y_t|e)$ and $\alpha$ are calculated using Equations (3) and (4), respectively:

$$p(y_t \mid e) = \sum_s N\left(y_t; \mu_s^e, \sum_s^e\right) p(s) \quad (3)$$

$$\alpha = 1 \Big/ \sum_{all\ e} p(y_t \mid e) \quad (4)$$

where N is Gaussian distribution, p(s) is a prior probability of each component of the GMM, and the feature vector $y_t$ is modeled by the GMM. The parameters of the GMM, the average vector μ and the covariance matrix Σ, can be calculated by using the EM algorithm.

The parameters of the GMM can be obtained by calculating a large number of feature vectors from speech data collected in a noise environment, and using the HTK that is a standard HMM learning tool for the speech recognition with calculated feature vectors as learning data.

The compensation-vector calculating unit 104 selectively acquires a compensation vector corresponding to each noise environment in the noise-environment series estimated by the noise-environment-series estimating unit 103, i.e., each noise environment estimated for each frame, from the noise-environment storing unit 120.

The compensation vector $r_s$ in each noise environment e can be calculated by the same method as a conventional SPLICE method. By preparing a plurality of sets $(x_n, y_n)$, where n is a positive integer, $x_n$ is a feature vector of clean speech data to which a noise is not added, and $y_n$ is a feature vector of noisy speech data to which the noise is added in each of the noise environments; the compensation vector $r_s^e$ can be calculated using Equation (5), where the superscript "e" representing the noise environment is omitted:

$$r_s = \frac{\sum_n p(s \mid y_n)(x_n - y_n)}{\sum_n p(s \mid y_n)} \quad (5)$$

where $p(s|y_n)$ is calculated using Equation (6):

$$p(s \mid y_n) = \frac{p(y_n \mid s)p(s)}{\sum_s p(y_n \mid s)p(s)} \quad (6)$$

The GMM parameters and the compensation vectors are calculated in the above manner in advance and stored in the noise-environment storing unit 120. Therefore, the compensation-vector calculating unit 104 acquires a compensation vector $r^{ei}$ corresponding to the noise environment estimated for each frame from among the noise environments 1 to 3 present in the noise-environment storing unit 120. In the example shown in FIG. 3, compensation vector 1, compensation vector 1, compensation vector 3, compensation vector 2, . . . , compensation vector 2 are acquired corresponding to each noise environment in the noise-environment series "noise environment 1→noise environment 1→noise environment 3→noise environment 2 → . . . →noise environment 2" in each frame, respectively. The compensation vector $r^{ei}$ is calculated using Equation (8) using the GMM parameters and the compensation vector of each noise environment and the feature vector y of each frame.

The feature-vector compensating unit 105 compensates the feature vector of the input speech by using the compensation vector obtained by the compensation-vector calculating unit 104. The feature-vector compensating unit 105 compensates the feature vector by adding the compensation vector to the feature vector.

Figure 4:
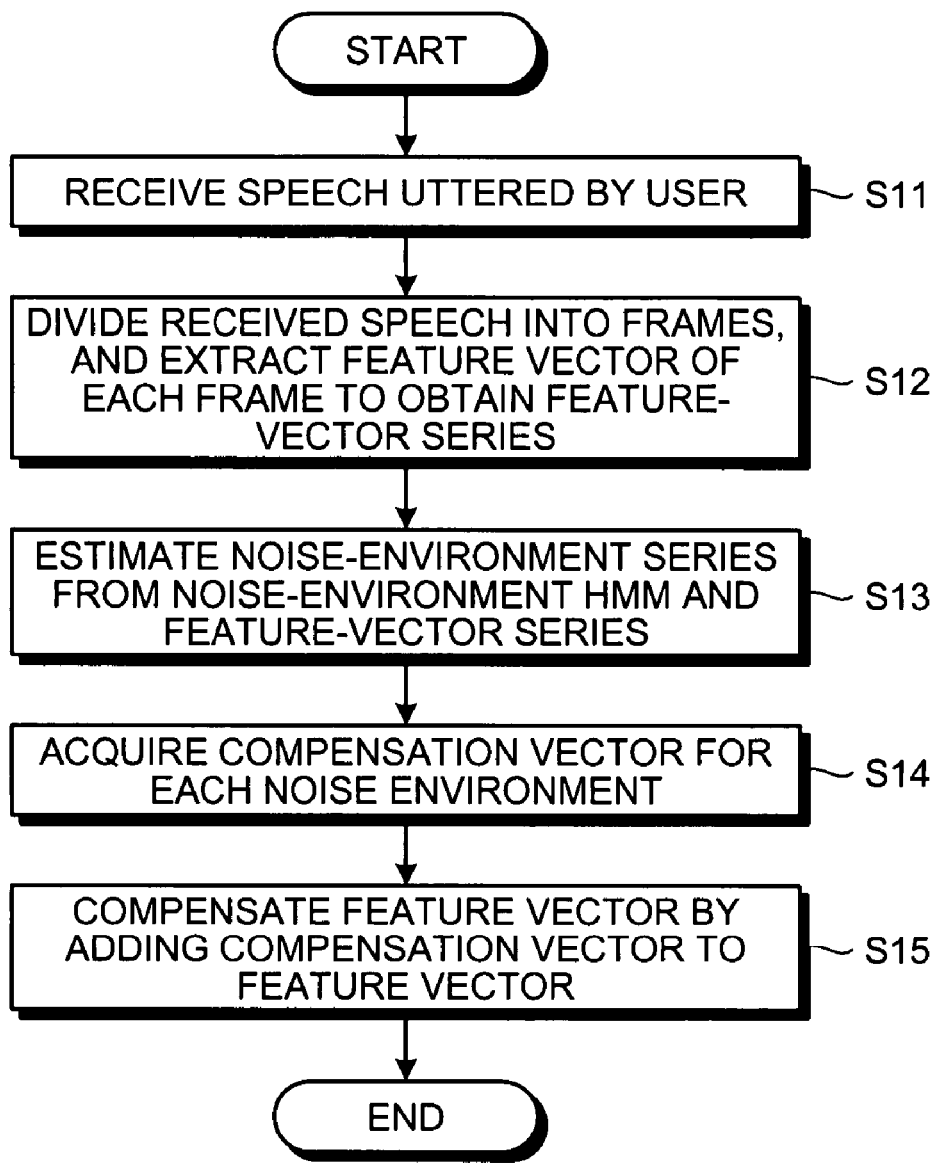
FIG. 4 is a flowchart of a feature-vector compensating process according to the first embodiment.

FIG. 4 is a flowchart of a feature-vector compensating process according to the first embodiment.

First of all, the input receiving unit 101 receives an input of a speech uttered by a user (step S11). The input speech is then converted into a digital speech signal by the input receiving unit 101.

The feature-vector extracting unit 102 divides the speech signal into frames of a predetermined frame length, such as 10 milliseconds, extracts the feature vector of each of the frames, and sets a series of feature vectors of the extracted frames as the feature-vector series (step S12). The feature-vector extracting unit 102 extracts the feature vector by calculating the feature vector $y_t$ of the MFCC, as described above.

The noise-environment-series estimating unit 103 estimates the noise-environment series from the noise-environment HMM present in the noise-environment-HMM storing unit 130 and the feature-vector series obtained by the feature-vector extracting unit 102 (step S13). As described above, the noise-environment series that is most likely in terms of the probability is estimated by using the state probability and the state transition probability of the noise-environment HMM in consideration of the degrees of attribute of previous frames including the last frame and subsequent frames including the next frame, in addition to the degree of similarity of the current frame, across a plurality of frames, using the Viterbi algorithm.

Subsequently, the compensation vector for each noise environment in the noise-environment series estimated by the noise-environment-series estimating unit 103 is obtained from the noise-environment storing unit 120 by the compensation-vector calculating unit 104 (step S14). Finally, the feature-vector compensating unit 105 performs a compensation of the feature vector by adding the compensation vector obtained by the compensation-vector calculating unit 104 to the feature vector (step S15).

Thus, according to the first embodiment, the selected noise environment is not abruptly changed for each frame, which enables the feature-vector compensating apparatus 100 to make a smooth selection close to a change of the actual noise environment. For this reason, an error in selecting the noise environment is relieved, and it is possible to obtain a feature vector of a speech with a high precision.

Furthermore, when the feature-vector compensating apparatus 100 is applied to a speech recognition process, even if the noise environment at a time of performing the speech recognition does not match the noise environment at a time of making a design, a high-precision feature vector can be calculated, which makes it possible to achieve a high speech-recognition performance.

In the feature-vector compensating apparatus 100, the feature vector is compensated by using the compensation vector corresponding to each noise environment in the estimated noise-environment series, obtained from the noise-environment storing unit 120. On the contrary, a feature-vector compensating apparatus according to a second embodiment of the present invention calculates the compensation vector by performing a weighting addition of the compensation vectors of a plurality of noise environments.

A configuration of the feature-vector compensating apparatus according to the second embodiment is the same as the feature-vector compensating apparatus according to the first embodiment shown in FIG. 1. In the feature-vector compensating apparatus according to the second embodiment, the function of the compensation-vector calculating unit 104 is different from the first embodiment, while other units have the same functions as the first embodiment.

The compensation-vector calculating unit 104 according to the second embodiment calculates the compensation vector r of a feature vector corresponding to an input speech by acquiring the compensation vector $r^{ei}$ of each noise environment from the noise-environment storing unit 120 and performing a weighting addition of the acquired compensation vector $r^{ei}$ by adding a weighting coefficient p(i) to each compensation vector $r^{ei}$.

In other words, the compensation-vector calculating unit 104 calculates an occupation probability p(i) of each state of the noise-environment HMM for each of a plurality of frames from a forward probability and a backward probability, and performs a weighting addition of the compensation vector $r^{ei}$ of each noise environment with the occupation probability p(i) of each state, to obtain the compensation vector r, where i is a positive integer indicating a number corresponding the noise environment i (i=1, 2, 3). The compensation vector r is calculated using Equation (7):

$$r = \sum_i p(i) r^{ei} \quad (7)$$

where $r^{ei}$ is calculated using Equation (8):

$$r^{ei} = \sum_s p(s \mid y) r^{ei}_s \quad (8)$$

Figure 5:
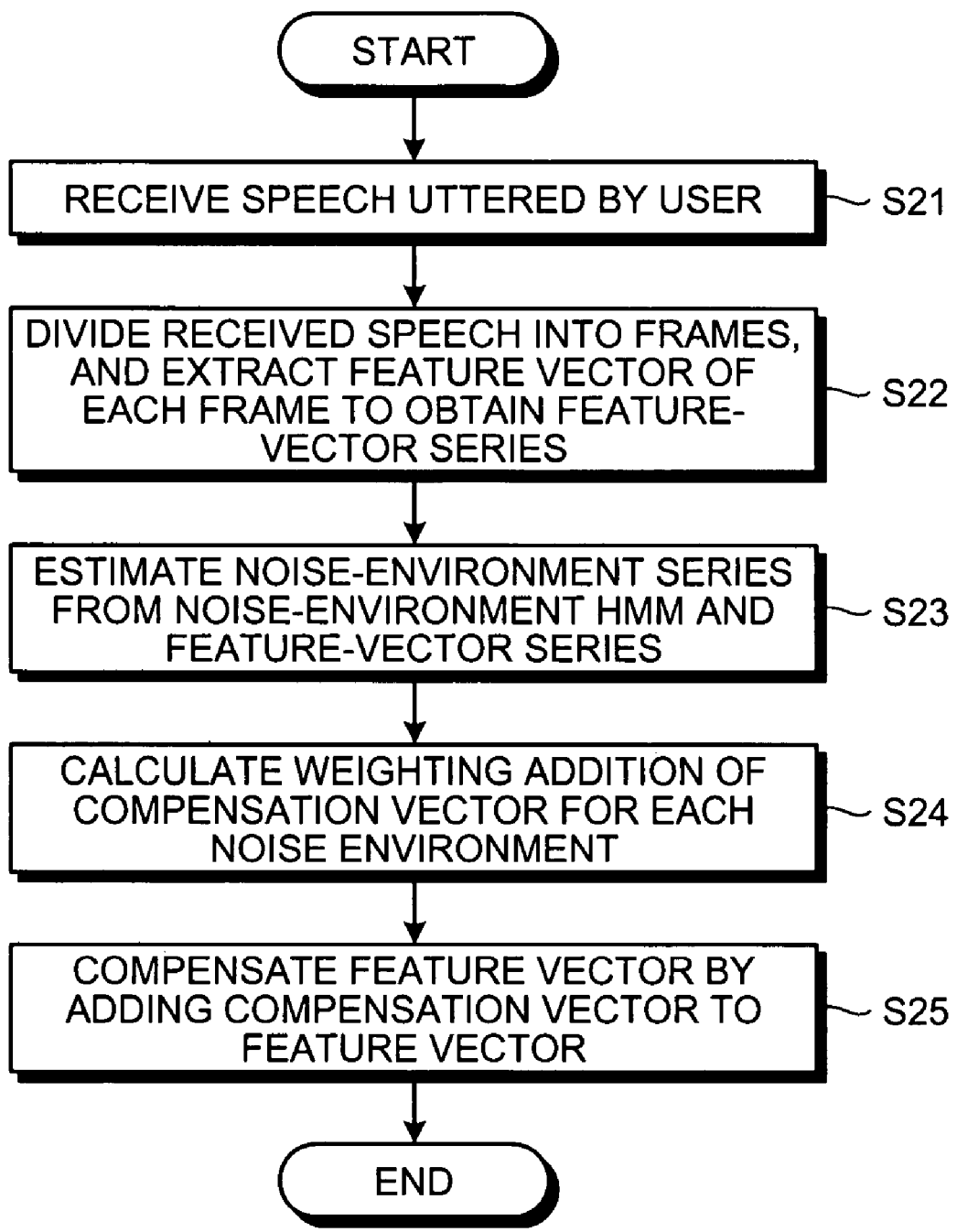
FIG. 5 is a flowchart of a feature-vector compensating process according to a second embodiment of the present invention.

FIG. 5 is a flowchart of a feature-vector compensating process according to the second embodiment.

The processes from a reception of an input of a speech from a user to an estimation of the noise-environment series (steps S21 to S23) are performed in the same way as the first embodiment.

After estimating the noise-environment series at step S23, the compensation-vector calculating unit 104 calculates the occupation probability p(i) of each state of the noise-environment HMM, and calculates the compensation vector $r_t$ for the feature vector of the input speech by performing a weighting addition of the compensation vector $r_s^e$ present in the noise-environment storing unit 120 with respect to each noise environment using the occupation probability p(i) as the weighting coefficient (step S24). Finally, in the same way as the first embodiment, the feature-vector compensating unit 105 compensates the feature vector by adding the compensation vector obtained by the compensation-vector calculating unit 104 to the feature vector (step S25).

In this manner, in the feature-vector compensating apparatus according to the second embodiment, the feature vector can be compensated with an even higher precision, which makes it possible to achieve a high speech-recognition performance even when the noise environment at a time of performing the speech recognition does not match the noise environment at a time of making a design.

In the feature-vector compensating apparatus according to the first embodiment, the noise-environment series is estimated for a plurality of frames with respect to the input speech. On the contrary, in a feature-vector compensating apparatus according to a third embodiment of the present invention; the noise-environment series is estimated sequentially for every single frame.

A configuration of the feature-vector compensating apparatus according to the third embodiment is the same as the feature-vector compensating apparatus according to the first embodiment shown in FIG. 1. In the feature-vector compensating apparatus according to the third embodiment, the function of the noise-environment-series estimating unit 103 is different from the first embodiment, while other units have the same functions as the first embodiment.

The noise-environment-series estimating unit 103 according to the third embodiment estimates the noise-environment series for every single frame based on a feature-vector series of a plurality of frames from a first input frame t to a current frame t+a (where "a" is a positive integer) and the noise-environment HMM. In other words, the noise environment of each frame is obtained by using the Viterbi algorithm with respect to the feature-vector series from the first input frame t to the current frame t+a, based on the same method as the first embodiment.

Figure 6:
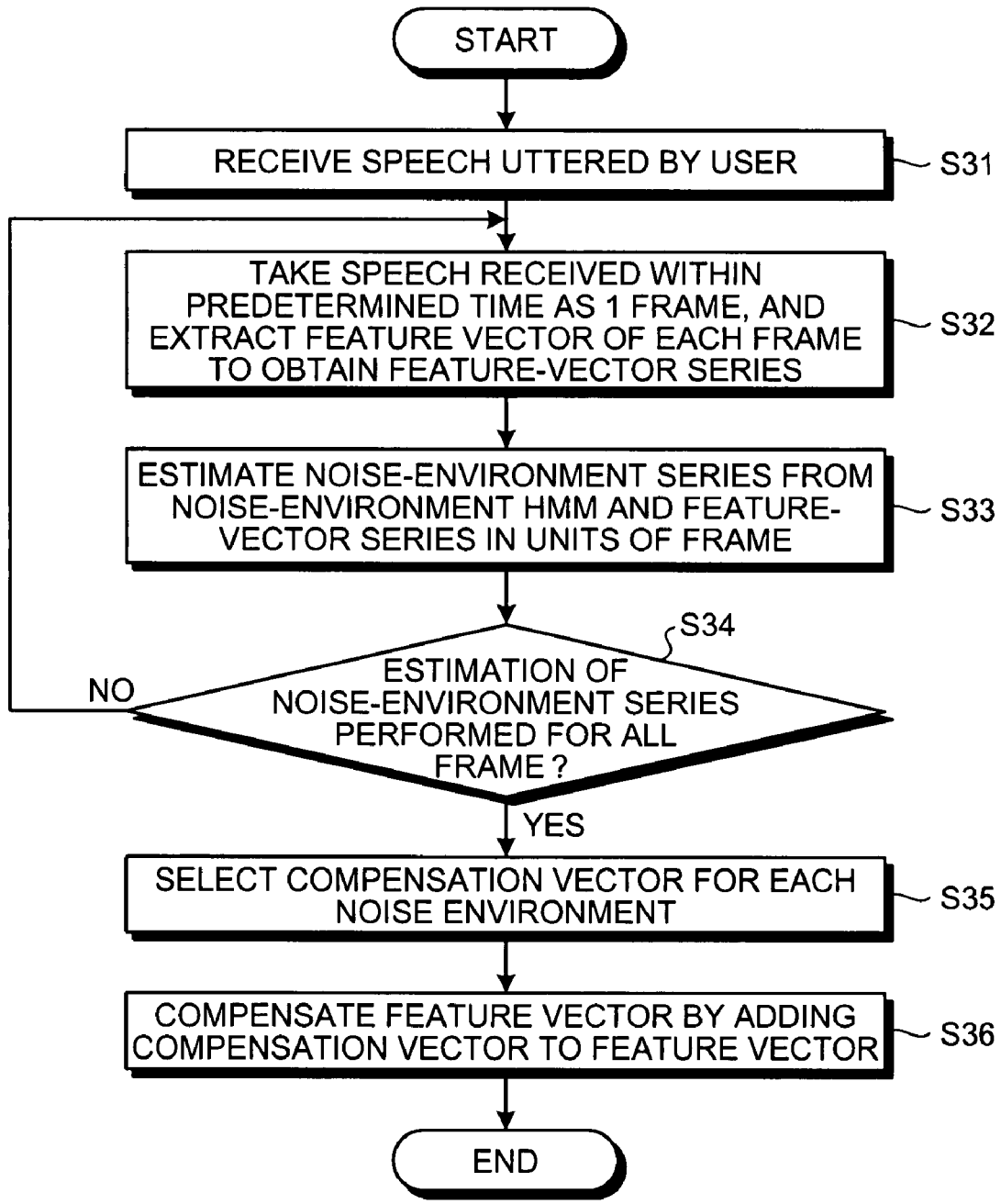
FIG. 6 is a flowchart of a feature-vector compensating process according to a third embodiment of the present invention.

FIG. 6 is a flowchart of a feature-vector compensating process according to the third embodiment.

First of all, in the same way as the first embodiment, the input receiving unit 101 receives an input of a speech uttered by a user (step S31). The feature-vector extracting unit 102 obtains a feature-vector series for each frame by taking a speech received within a predetermined time as one frame (step S32).

The noise-environment-series estimating unit 103 estimates a noise-environment series for every single frame from the noise-environment HMM present in the noise-environment-HMM storing unit 130 and the feature-vector series obtained by the feature-vector extracting unit 102 for the frames from the first input frame t to the current frame t+a (step S33). Then, steps S32 and S33 are repeatedly executed for all frames of the input speech (step S34). Subsequently, in the same way as the first embodiment, the compensation vector for each noise environment in the noise-environment series estimated by the noise-environment-series estimating unit 103 is obtained from the noise-environment storing unit 120 by the compensation-vector calculating unit 104 (step S35). Finally, the feature-vector compensating unit 105 performs a compensation of the feature vector by adding the compensation vector obtained by the compensation-vector calculating unit 104 to the feature vector (step S36).

In this manner, in the feature-vector compensating apparatus according to the third embodiment, the feature vector can be compensated in a stable manner with an even higher precision, which makes it possible to achieve a high speech-recognition performance. In addition, it is also possible to suppress a delay between an input of the feature vector and an output of the compensated feature vector below a constant level.

Furthermore, when a weighting addition is used for obtaining the compensation vector as in the feature-vector compensating apparatus according to the second embodiment, the occupation probability p(i) can be calculated for a plurality of frames from the first input frame t to the current frame t+a. In this case, the forward probability and the backward probability is obtained for the frames from the first input frame t to the current frame t+a, to calculate the occupation probability p(i) of each state.

Figure 7:
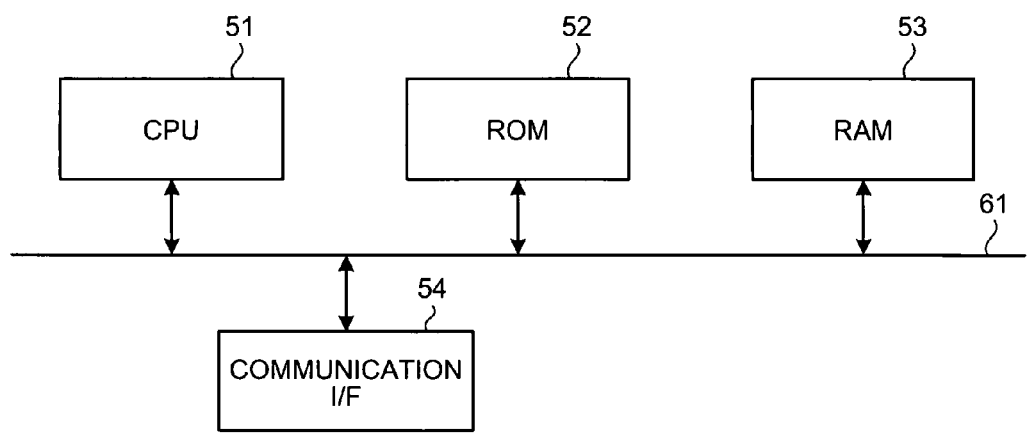
FIG. 7 is a schematic for explaining a hardware configuration of the feature-vector compensating apparatus according to the first to the third embodiments.

FIG. 7 is a schematic for explaining a hardware configuration of the feature-vector compensating apparatus according to any one of the first to the third embodiments.

The feature-vector compensating apparatus includes a control device such as a central processing unit (CPU) 51, a storage device such as a read only memory (ROM) 52 and a random access memory (RAM) 53, a communication interface (I/F) 54 for performing a communication via a network, and a bus 61 that connects the above components.

A computer program (hereinafter, "feature-vector compensating program") executed in the feature-vector compensating apparatus is provided by a storage device such as the ROM 52 pre-installed therein.

On the contrary, the feature-vector compensating program can be provided by storing it as a file of an installable format or an executable format in a computer-readable recording medium, such as a compact disk-read only memory (CD-ROM), a flexible disk (FD), a compact disk-recordable (CD-R), and a digital versatile disk (DVD).

As another alternative, the feature-vector compensating program can be stored in a computer that is connected to a network such as the Internet, so that the program can be downloaded through the network. As still another alternative, the feature-vector compensating program can be provided or distributed through the network such as the Internet.

The feature-vector compensating program is configured as a module structure including the above function units (the input receiving unit, the feature-vector extracting unit, the noise-environment-series estimating unit, the compensation-vector calculating unit, and the feature-vector compensating unit). Therefore, as an actual hardware, the CPU 51 reads out the feature-vector compensating program from the ROM 52 to execute the program, so that the above function units are loaded on a main memory of a computer, and created on the main memory.

As described above, the feature-vector compensating apparatus, the feature-vector compensating method, and the feature-vector compensating program according to the embodiments of the present invention are suitable for performing a speech recognition and a speaker authentication using a feature vector of a speech.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature-vector compensating apparatus for compensating a feature vector of speech used in speech processing under a background noise environment, comprising:
  a first storing unit that stores therein a compensation vector for compensating the feature vector of the speech for each of a plurality of noise environments;
  a second storing unit that stores therein a noise-environment hidden Markov model that maintains each of the noise environments as a state and is obtained by modeling parameters of a Gaussian mixture model that is a probability model of the feature vector in each of the noise environments and a state transition probability between states;
  a feature extracting unit that extracts the feature vector of the speech in each of a plurality of frames of input speech;
  an estimating unit that estimates a noise-environment series based on the noise-environment hidden Markov model, a feature-vector series including a plurality of extracted feature vectors for the frames and a degree of similarity that indicates a certainty that a respective feature vector is generated under the noise environment in each current frame and at least one of an immediately previous frame and an immediately subsequent frame of the current frame, the noise-environment series being a series of noise environments which generates each of the plurality of extracted feature vectors in the feature-vector series;
  a calculating unit that obtains a compensation vector corresponding to each noise environment in the estimated noise-environment series based on the compensation vectors present in the first storing unit, wherein the calculating unit obtains a first compensation vector from the compensation vector present in the first storing unit, and calculates a second compensation vector by performing a weighting addition of the obtained first compensation vector with an occupation probability of each state obtained from the noise-environment hidden Markov model as a weighting coefficient; and a compensating unit that compensates the extracted feature vectors of the speech based on the obtained second compensation vectors.

2. The apparatus according to claim 1, wherein
the feature extracting unit divides the input speech into a plurality of frames, and extracts the feature vector of the speech in each of the frames, and
the estimating unit estimates the noise-environment series based on the feature-vector series for the frames and the degree of similarity for the feature vectors in the frames.

3. The apparatus according to claim 1, wherein
the estimating unit sequentially estimates the noise-environment series based on the feature-vector series for a plurality of frames from a predetermined frame to a current frame and the degree of similarity for the feature vector in the frames from the predetermined frame to the current frame.

4. The apparatus according to claim 1, wherein
the compensating unit compensates the extracted feature vector of the speech by performing an addition of the second compensation vector to the feature vector.

5. The apparatus according to claim 1, wherein
the first storing unit stores therein the compensation vector calculated from noisy speech that is speech under the noise environment and clean speech that is speech under an environment free from the noise, for each noise environment.

6. The apparatus according to claim 1, wherein
the extracting unit extracts a Mel frequency cepstrum coefficient of the input speech as the feature vector.

7. A method executed by an apparatus for compensating a feature vector of speech used in speech processing under a background noise environment, the apparatus comprising:
a first storing unit that stores therein a compensation vector for compensating the feature vector of the speech for each of a plurality of noise environments; and
a second storing unit that stores therein a noise-environment hidden Markov model that maintains each of the noise environments as a state and is obtained by modeling parameters of a Gaussian mixture model that is a probability model of the feature vector in each of the noise environments and a state transition probability between states;
the method comprising:
extracting the feature vector of the speech in each of a plurality of frames of input speech;
estimating a noise-environment series based on the noise-environment hidden Markov model, a feature-vector series including a plurality of extracted feature vectors for the frames and a degree of similarity that indicates a certainty that a respective feature vector is generated under the noise environment in each current frame and at least one of an immediately previous frame and an immediately subsequent frame of the current frame, the noise-environment series being a series of the noise environments which generates each of the plurality of extracted feature vectors in the feature-vector series;
obtaining a compensation vector corresponding to each noise environment in the estimated noise-environment series based on a previously calculated compensation vector, the obtaining including obtaining a first compensation vector from the compensation vector present in the first storing unit, and calculates a second compensation vector by performing a weighting addition of the obtained first compensation vector with an occupation probability of each state obtained from the noise-environment hidden Markov model as a weighting coefficient; and
compensating the extracted feature vectors of the speech based on the obtained second compensation vectors.

8. A computer program product including a non-transitory computer readable medium storing program instructions,
wherein the instructions, when executed by a computer, cause the computer to perform operations comprising:
extracting a feature vector of speech in each of a plurality of frames of input speech;
estimating a noise-environment series based on a noise-environment hidden Markov model, a feature-vector series including a plurality of extracted feature vectors for the frames and a degree of similarity that indicates a certainty that a respective feature vector is generated under a noise environment in each current frame and at least one of an immediately previous frame and an immediately subsequent frame of the current frame, the noise-environment series being a series of a plurality of noise environments which generates each of the plurality of extracted feature vectors in the feature-vector series, the noise-environment hidden Markov model maintaining each of the noise environments as a state and being obtained by modeling parameters of a Gaussian mixture model that is a probability model of the feature vector in each of the noise environments and a state transition probability between states;
obtaining a compensation vector corresponding to each noise environment in the estimated noise-environment series based on a previously calculated compensation vector, the obtaining including obtaining a first compensation vector from the compensation vector present in a first storing unit that stores therein the compensation vector for compensating the feature vector of the speech for each of the plurality of noise environments, and calculates a second compensation vector by performing a weighting addition of the obtained first compensation vector with an occupation probability of each state obtained from the noise-environment hidden Markov model as a weighting coefficient; and
compensating the extracted feature vectors of the speech based on the obtained second compensation vectors.

* * * * *